United States Patent [19]

Takayama

[11] Patent Number: 4,589,381
[45] Date of Patent: May 20, 1986

[54] INTAKE SYSTEM FOR INTERNAL COMBUSTION ENGINE

[75] Inventor: Teruo Takayama, Katsuta, Japan
[73] Assignee: Hitachi, Ltd., Tokyo, Japan
[21] Appl. No.: 654,456
[22] Filed: Sep. 26, 1984
[30] Foreign Application Priority Data Sep. 28, 1983 [JP] Japan .................... 58-178043
Mar. 2, 1984 [JP] Japan .................... 59-38585

[51] Int. Cl.⁴ .......................................... F02B 27/02
[52] U.S. Cl. .................................. 123/52 M; 123/470
[58] Field of Search ............ 123/470, 472, 478, 52 M

[56] References Cited

U.S. PATENT DOCUMENTS

| | | | |
|---|---|---|---|
| 3,024,774 | 3/1962 | Eby, Jr. ............................ | 123/52 M |
| 3,973,543 | 8/1976 | Nakada ............................ | 123/547 |
| 4,064,696 | 12/1977 | Cser ................................. | 123/52 M |
| 4,108,124 | 11/1978 | Nakagawa et al. .............. | 123/52 M |
| 4,212,277 | 7/1980 | Melotti ............................. | 123/470 |
| 4,235,375 | 11/1980 | Melotti ............................. | 123/470 |
| 4,300,488 | 11/1981 | Cser ................................. | 123/52 M |

FOREIGN PATENT DOCUMENTS 2082252 3/1982 United Kingdom ............. 123/470

*Primary Examiner*—Magdalen Y. C. Moy
*Attorney, Agent, or Firm*—Antonelli, Terry & Wands

[57] ABSTRACT

An intake system for an internal combustion engine has an induction passage which extends substantially horizontally from a throttle body accommodating a throttle valve to an intake manifold of the engine. A fuel injector is disposed in the throttle body substantially coaxially with the throttle body. Fuel is supplied to the injector through a fuel inlet passage, while excess fuel is returned through a fuel outlet passage. At least the fuel outlet passage extends upwardly from the injector.

16 Claims, 9 Drawing Figures

INTAKE SYSTEM FOR INTERNAL COMBUSTION ENGINE

BACKGROUND OF THE INVENTION

The present invention relates to an intake system for supplying an internal combustion engine with fuel and air and, more particularly, to an intake system of the type having a fuel injector.

Injection type fuel supplying systems for internal combustion engines, offer various advantages such as cleaning of exhaust emissions, saving of fuel, as well as improvements in the engine output and in the driveability, and so forth. For this reason, this type of system is becoming popular as the fuel supplying system for motor vehicle internal combustion engines. Broadly, the fuel injection type fuel supplying systems can be sorted into two types; namely, a multi-point injection type system in which fuel is injected through fuel injectors which are annexed to respective cylinders of an engine, and a single-point injection type system in which the fuel is injected through a single fuel injector which is disposed upstream of an intake manifold.

In order to fully enjoy the above-mentioned advantages of the fuel injection type fuel supplying system, it is essential that the rate of supply of the fuel is accurately controlled. However, it is quite difficult to control the rate of fuel supply at a sufficiently high accuracy for the reasons described hereinbelow.

For instance, when the temperature in the engine compartment of a motor vehicle is raised, the fuel in the fuel passage is heated to generate vapor. Consequently, the fuel injector injects not only the liquid phase of the fuel but also the vapor phase of the fuel stagnant in the fuel passage in the vicinity of the fuel injector. This means that the net amount of fuel supplied into the induction passage is decreased causing a corresponding reduction in the engine output and impairment of the driveability. Furthermore, when the fuel vapor pressure is excessively high or when the volume of the fuel vapor is excessively large, the driver often finds it difficult to re-start the engine after a stop thereof.

To avoid this problem, in, for example, Japanese Patent Laid-Open Publication No. 79666/1983, an intake system is proposed which injects fuel in a vertical direction however, this proposed intake system encounters the following problems.

In the manufacture of motor vehicles and more particularly, passenger vehicles, it is a current trend to decrease the height of the hood or bonnet mainly for aesthetics and aerodynamics. The reduced height of the hood or bonnet, in turn, requires a reduction in the vertical dimension between the air cleaner and the outlets of the intake manifold, i.e., the intake ports opening to the cylinder. The system proposed in Japanese Patent Laid-Open Publication No. 79666/1983 is of the single-point injection type, wherein the induction passage between the outlet of the air cleaner and the common upstream end portion of the intake manifold is bent substantially at a right angle. Namely, the induction passage has a vertical section extending substantially vertically from the air cleaner and a horizontal section extending horizontally to the intake manifold. The vertical section of the induction passage includes a throttle valve chamber in which are disposed a fuel injector and a throttle valve. It is, therefore, understood that the reduction in the vertical dimensional difference between the air cleaner and the intake manifold is attained by reducing the length of the vertical section of the induction passage. The reduction in the length of the vertical section of the induction passage, however, causes the injected fuel to impinge upon the wall in the bend of the induction passage so that a part of the fuel is supplied to the combustion chambers in the form of liquid film. This is quite unfavorable from the view point of emission control.

SUMMARY OF THE INVENTION

Accordingly, an object of the invention is to provide an intake system having a substantially horizontal induction passage starting from a throttle body to the intake manifold and a fuel injector adapted to inject the fuel substantially horizontally into the induction passage.

In contrast to the conventional intake system in which the air cleaner projects upwardly from the top of the cylinder head of the engine, the intake system of the invention permits a substantial reduction of the height difference between the air cleaner and the intake ports of the engine, well meeting the current demand for reduction in the hood or bonnet height. In addition, the horizontally injected fuel does not impinge upon the induction passage wall but is sufficiently atomized and mixed with the air in the induction passage to form an air-fuel mixture suited to the combustion, thus attaining a good emission control.

The above and other objects, features and advantages of the invention will become clear from the following description of preferred embodiments with reference to the accompanying drawings.

DESCRIPTION DETAILED

Figure 1:
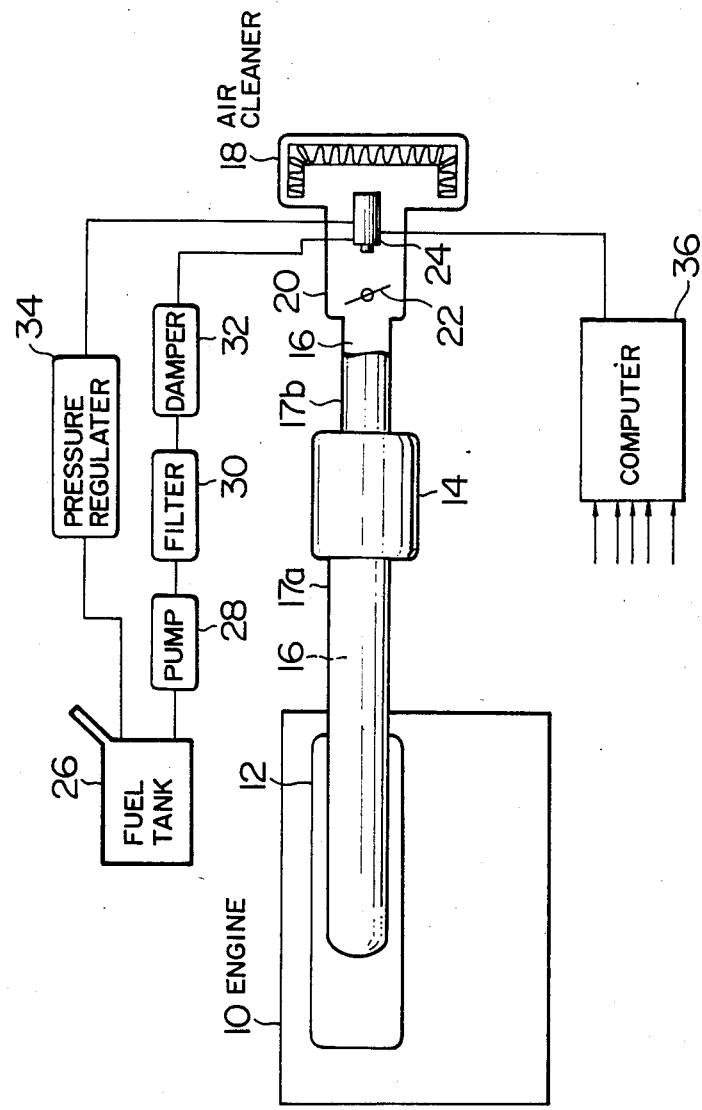
FIG. 1 is a schematic side elevational view of an embodiment of an intake system in accordance with the invention, wherein a fuel circuit and an electric control system are shown in a block diagram.
Figure 2:
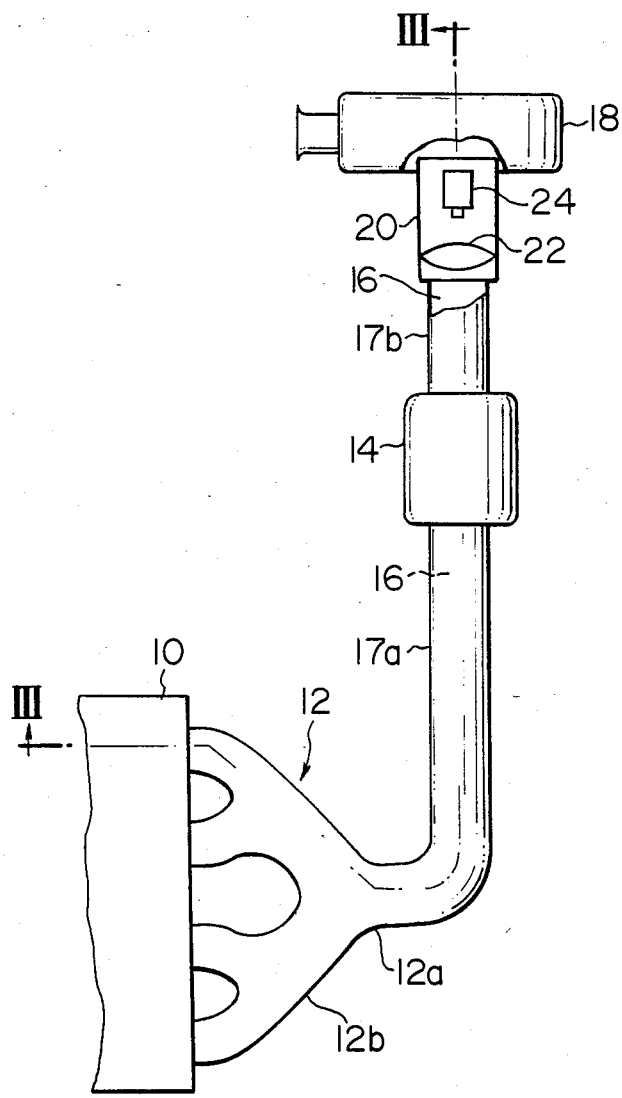
FIG. 2 is a top plan view of the intake system shown in FIG. 1.

Referring now to the drawings wherein like reference numerals are used throughout the various views to designate like parts and, more particularly, to FIGS. 1 to 4 according to these figures, an intake system in accordance with the invention includes an intake manifold 12 connected to an internal combustion engine generally designated by the reference numeral 10 mounted in a motor vehicle (not shown). The intake manifold 12 has a common upstream portion 12a and downstream end branches 12b branching from the common upstream portion 12a and connected to intake ports (not shown) of respective cylinders of the internal combustion engine 10. The common upstream portion 12a is connected to a substantially horizontally disposed air cleaner 18 by an induction passage 16 defined by a first duct 17a connected to the upstream end opening 12c of the intake manifold 12, a surge tank 14 connected to the upstream end of the duct 17c, a second duct 17b connected to the inlet side of the surge tank 14 and a throttle body 20 connected to the upstream end of the duct 17b. The throttle body 20 accomodates a throttle valve 22 and an injector 24 disposed upstream of the throttle valve 22. The injector 24 is disposed substantially horizontally in the manner to be described more fully hereinbelow.

The fuel injector 24 is adapted to be supplied with fuel from a fuel tank 26 through a fuel pump 28, a filter 30 and a fuel pressure damper 32. A fuel pressure regulator valve 34 is disposed in a fuel return passage which extends from the fuel injector 25 back to the fuel tank 26. The fuel injector 24 injects the fuel in response to an injector opening signal from a digital computer 36 which conducts a computation to determine and deliver optimum valve opening signals in accordance with parameters representing the state of operation of the engine, such as the air flow rate into the engine 10, the engine cooling water temperature, the engine speed, $O_2$ content of the engine exhaust gas, and so forth. In FIG. 1, these parameters are represented by arrows as inputs to the computer 36.

Figure 4:
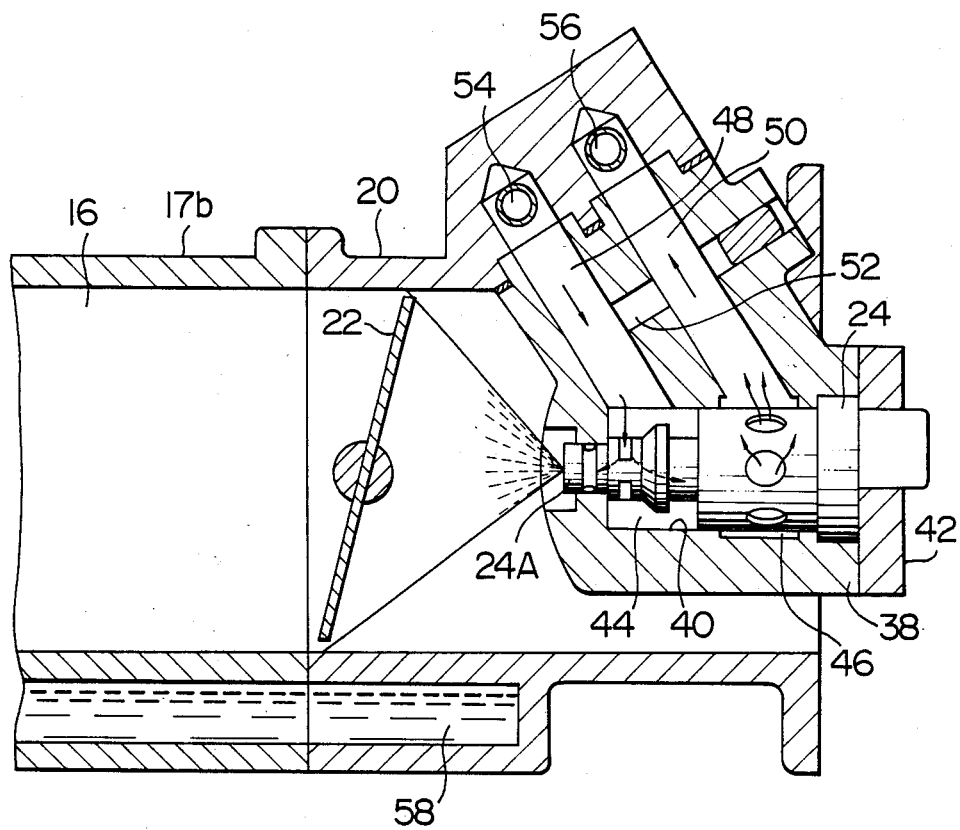
FIG. 4 is an enlarged sectional view of an essential part of the intake system, showing particularly a throttle body, a throttle valve, a fuel injector and fuel passages.

Referring particularly to FIG. 4, the throttle valve 22 is rotatably mounted in the throttle body 20. The injector 24, having a substantially cylindrical form, is coaxially disposed in the induction passage 16. However, that the axis of the fuel injector 24 need not strictly coincide with the axis of the induction passage 16 and the advantages of the invention are attainable provided that the axis of the fuel injector 24 extends substantially in parallel with the axis of the induction passage 16.

The fuel injector 24 is housed in a housing portion 40 in a holder 38 which projects into the induction passage 16 from the inner surface of the portion of the induction passage 16 upstream of the throttle body 20. A cover 42, abutting the rear end of the injector 24, is fixed to the rear surface of the holder 38 by bolts, not shown, to fix the fuel injector 24 to the holder 38.

The fuel injector 24 itself may be of a conventional construction of the type proposed in, for example, U.S. Pat. No. 4,186,708. Thus, a detailed description will not be needed for the construction and operation of the fuel injector 24.

An opening is formed in the front wall of the holder 38 which forms the forward wall of the housing portion 40. The front end portion 24A of the injector 24 forwardly projects through the opening, i.e., towards the throttle valve 22, with a liquid-tight seal formed between the inner peripheral surface of the opening and the outer peripheral surface of the front end portion 24A of the injector 24, with an injection orifice being formed in the forward end of the fuel injector 24.

A fuel inlet chamber 44 and a fuel outlet chamber 46 are formed between the holder 38 and the fuel injection valve 24. The fuel inlet chamber 44 and the fuel outlet chamber 46 communicate with each other through a fuel returning passage (not shown) formed in the body of the fuel injector 24. The fuel inlet chamber 44 and the fuel outlet chamber 46 are respectively connected to a fuel inlet passage 48 and fuel outlet passage 50 formed in the holder 38. The fuel inlet passage 48 and the fuel outlet passage 50 extens upwardly above the horizontal plane which includes the fuel axis of the injector 24 and at an acute angle to the axis of the fuel injector 24. The fuel inlet passage 48 and the fuel outlet passage 50 partially communicate with each other through a passage 52 intended to remove bubbles in the fuel.

A fuel inlet port 54 and a fuel outlet port 56 are formed in the upper peripheral wall of the throttle body 20 and respectively communicate with the fuel inlet passage 48 and the fuel outlet passage 50.

The holder 38 is formed as a member independent of the throttle body 20 and is connected thereto by, for example, bolts, for a reason concerning the die-casting technique.

In operation, the fuel, pumped by the fuel pump 28, is delivered to the fuel inlet port 54, formed in the throttle body 20, and is introduced to the fuel inlet chamber 44 through the fuel inlet passage 48 formed in the holder 38. A part of the fuel is injected into the induction passage 16 while the other part of the fuel is returned to the fuel tank 26 through the fuel outlet chamber 46, the fuel outlet passage 50 and the fuel outlet port 56 as shown by the arrows in FIG. 4.

Because the induction passage 16 is formed as a substantially horizontal passage and the fuel injector 24 is disposed substantially horizontally, almost no liquid film is formed by the fuel injected by the fuel injector 24 but the fuel is finely atomized into particles which are mixed with the air to form a moderate air-fuel mixture to be sucked into the combustion chambers of the internal combustion engine.

In the conventional system of the type described above, the fuel may not be injected when bubbles of fuel vapor stagnate in or around the fuel injector 24. The intake system of the invention, however, is free from this problem because all the fuel passages such as the fuel inlet and outlet passages 48 and 50, communicating with the fuel inlet and outlet chambers 44 and 46, as well as the fuel inlet port 54 and the fuel outlet port 56, extend upwardly from a level above the horizontal plane which contains the axis of the fuel injector 24 so as to allow the bubbles of fuel vapor to ascend or rise through these passages thereby avoiding stagnation of bubbles of fuel vapor within and around the injector 24.

Figure 3:
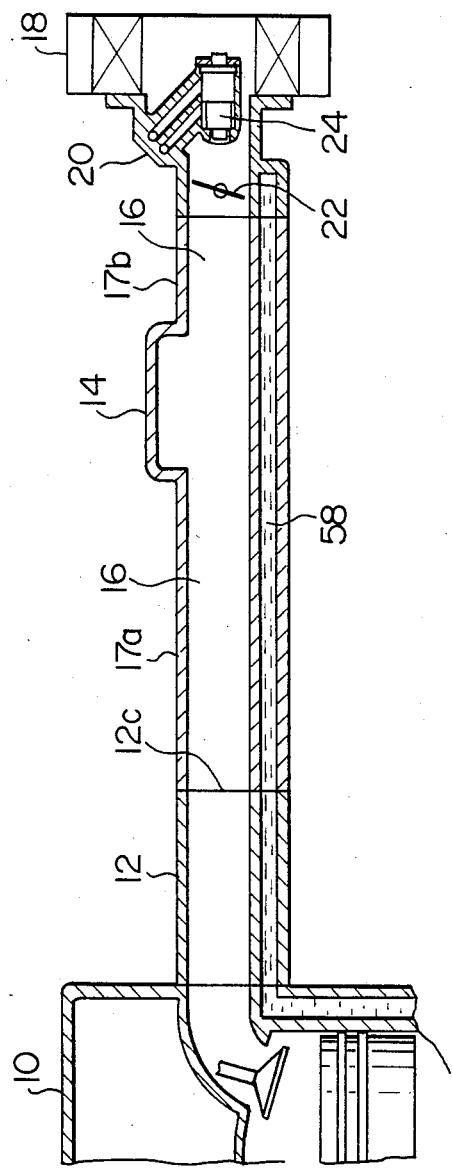
FIG. 3 is a sectional view taken along the line III—III of FIG. 2.

As shown in FIGS. 3 and 4, a passage 58 for heated water is formed under the induction passage 16, with the passage 58 communicating with a cooling water jacket in the engine 10 so that the water heated by the engine is circulated through the passage 58 to promote the evaporation of the fuel adhering to the bottom surface of the induction passage, thus effectively preventing formation of liquid fuel film on the wall surface of the induction passage. Preferably, the passage 58 extends to a portion near the forward end of the injector 24. This intake system can be fabricated and assembled easily because the holder 38 and the throttle body 20 are prepared as separate members.

Figure 5:
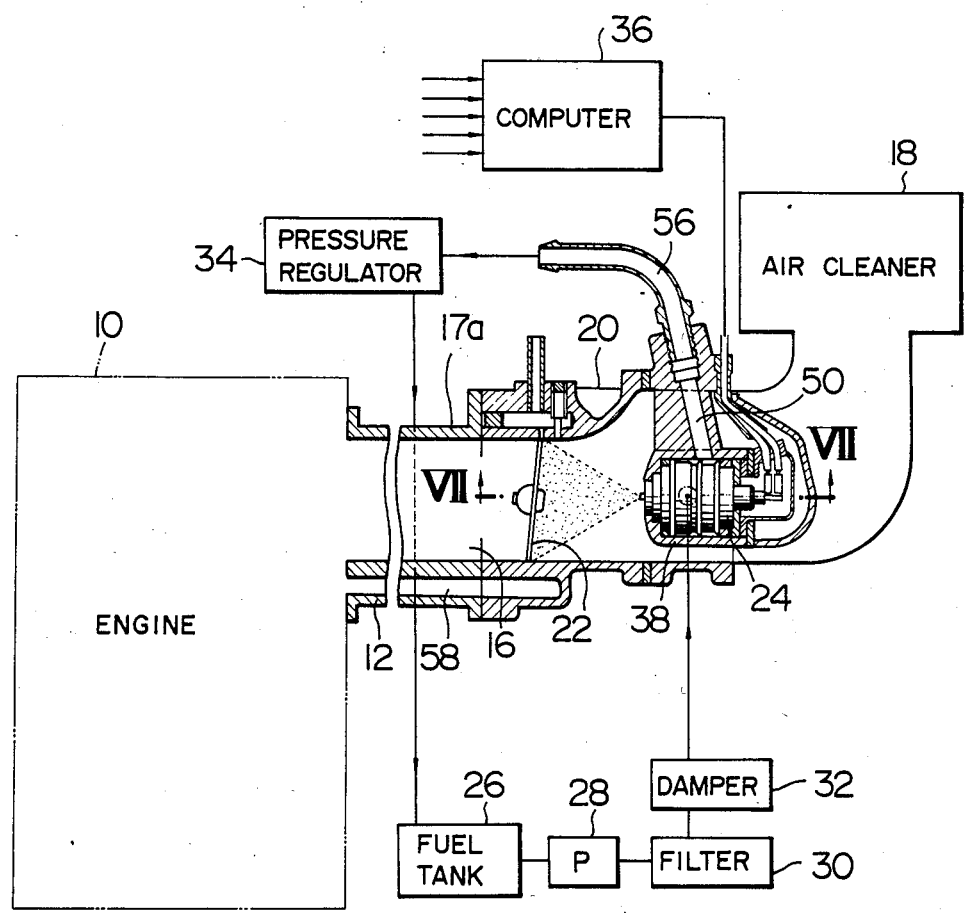
FIG. 5 is a vertical sectional view of a modification of the embodiment shown in FIGS. 1 to 4.
Figure 6:
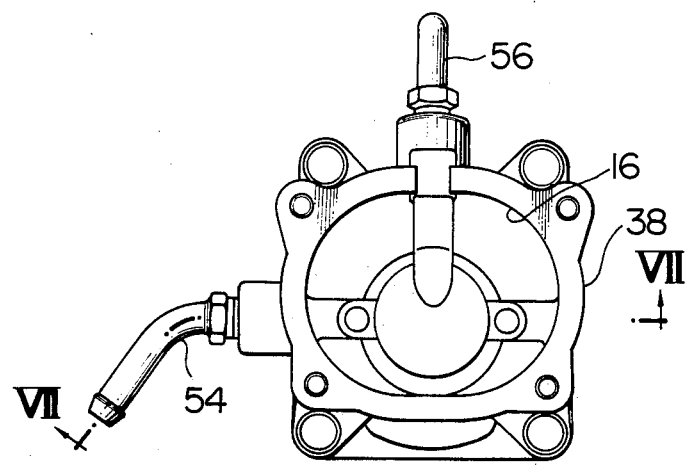
FIG. 6 is a rear elevational view of the modification shown in FIG. 5, as viewed from the right side in FIG. 5, with an air cleaner and an elbow-shaped air duct connected to the air cleaner being omitted for the clarification purpose.
Figure 7:
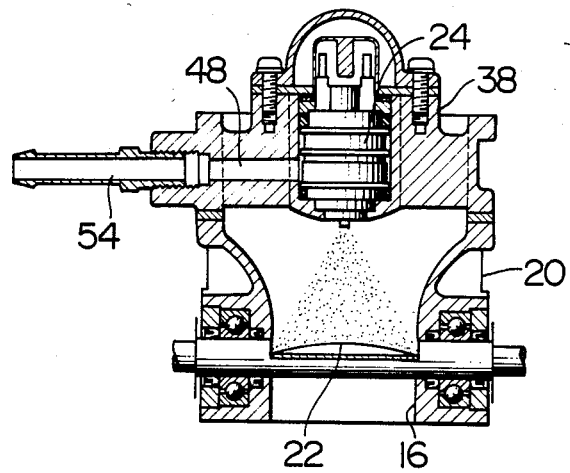
FIG. 7 is a sectional view taken along the line VII—VII in FIGS. 5 and 6.

In the embodiment of FIGS. 5–7, the holder 38, secured to the throttle body 20, is modified such that the fuel inlet passage 48 extends in the horizontal plane containing the axis of the fuel injector 24, while the fuel outlet passage 50 extends upwardly above the above-mentioned horizontal plane. As a result of this modification, the fuel inlet port 54 extends horizontally from the holder 38, while the fuel outlet port 56 projects upwardly. In this modification, the inner surface of the throttle body 20 defining a portion of the induction passage 16 diverges its upstream end from the cylindrical portion accomodating the throttle valve 22, and the holder 38 is attached to the diverged upstream end of the throttle body 20. Thus, the holder 38 has a generally tubular form with three radial spiders disposed therein. The fuel inlet passage 48 is formed in one of the three spiders, while the fuel outlet passage 50 is formed in another spider.

In FIGS. 5-7, when vapor of fuel is generated in or around the fuel injector 24, the vapor ascends through the fuel outlet passage 50 extending upwardly from the fuel injector 24, so that the undesirable injection of the fuel vapor from the fuel injector 24 into the induction passage 16 is advantageously avoided.

Figure 8:
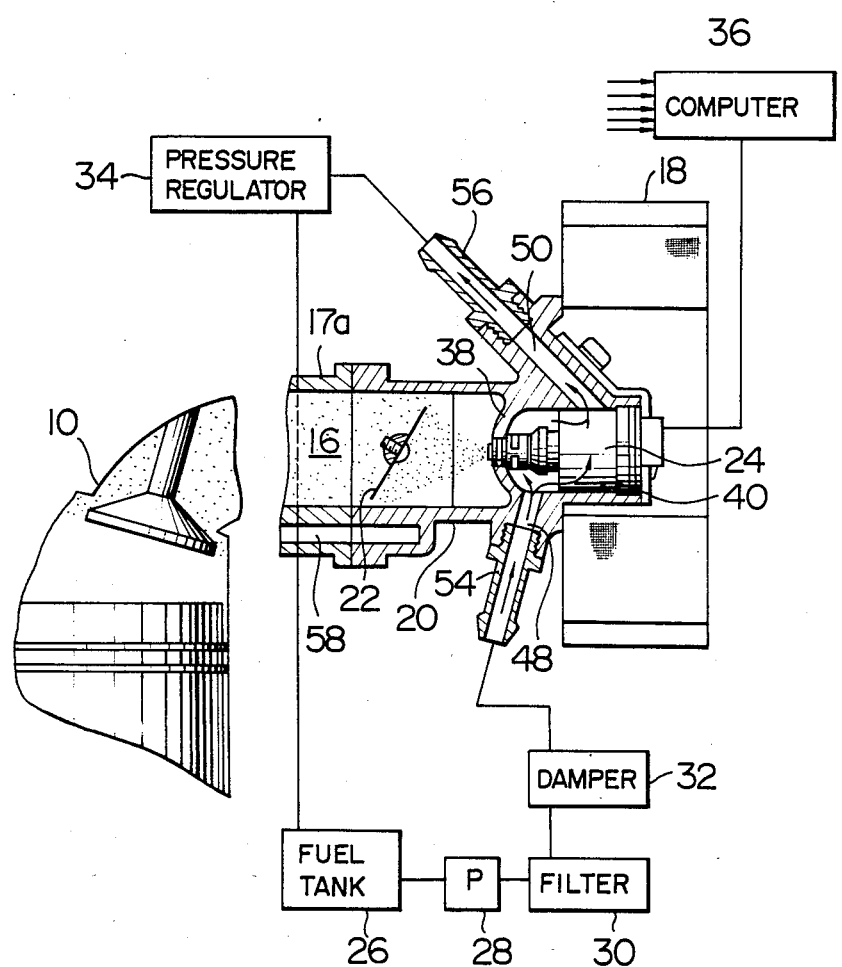
FIG. 8 is a schematic vertical sectional view of a second modification.

In FIG. 8, the throttle body 20 and the holder 38 are integral, and the fuel inlet passage 48, formed in the holder 38, extends in a substantially vertical plane containing the axis of the fuel injector 24 from the lower side of the holder 38 upwardly to the housing portion 40. On the other hand, the fuel outlet passage 50 extends upwardly from the housing portion 40 within the above-mentioned vertical plane and is connected to the fuel outlet port 56. Thus, the fuel flows generally upwardly through the fuel inlet passage 48 and the fuel outlet passage 50. Therefore, the bubbles of fuel vapor, if any, can smoothly move upwardly from the fuel injector 24 towards the outlet passage 50, due to the buoyancy and the dynamic force of the upward flow of fuel, so that the undesirable injection of vapor phase of fuel from the fuel injector 24 into the induction passage 16 is almost perfectly avoided.

The following advantage is derived commonly from the embodiment of FIGS. 1 to 4 and two modifications thereof explained of FIGS. 5 to 8. During suspension of operation of the internal combustion engine 10 after a continuous operation, there is no flow of fuel because the fuel pump does not operate. Therefore, the fuel staying in the housing portion 40, inlet passage 48 and the fuel injector 24 tends to be evaporated by the heat accumulated in the internal combustion engine 10 to form vapor. The thus formed vapor of fuel inconveniently impedes the re-starting of the internal combustion engine 10. In the first embodiment and its modifications described hereinbefore, however, the fuel vapor, if any, tends to move into the fuel outlet passage 50 which extends upwardly from the housing portion 40 and further upwardly through this fuel outlet passage 50. Therefore, the fuel injector 24 is filled with liquid phase fuel to facilitate the re-starting of the engine.

Figure 9:
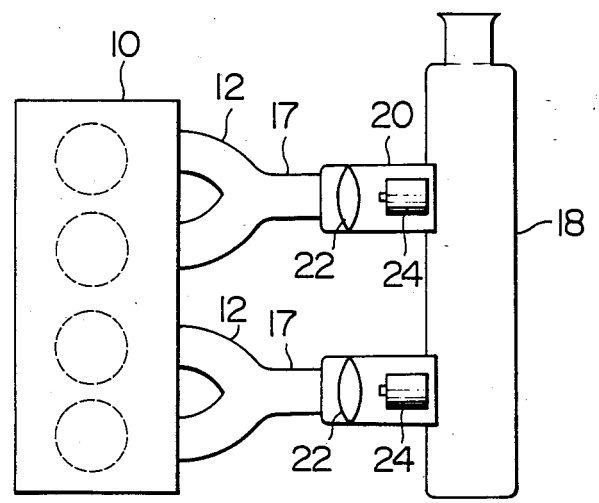
FIG. 9 is a schematic top plan view of a second embodiment of the intake system in accordance with the invention.

The embodiment of FIG. 9 represents an intake system in accordance with the invention applied to a 4-cylinder in-line engine. Wherein the intake system has a dual arrangement such that each intake system supplies the mixture to the combustion chambers of two cylinders. Each of two intake systems can have a construction same as that of the first embodiment or either one of the modifications explained hereinbefore.

What is claimed is:

1. An intake system for an internal combustion engine having cylinders and intake ports extending therefrom, the intake system including an induction passage which extends from an outlet of an air cleaner to an upstream end of an intake manifold having an upstream end and branched downstream ends connected to the intake ports said intake manifold being disposed on the engine at a position which is not higher than a top surface of the engine, a fuel injector having a longitudinal axis is disposed in said induction passage, a throttle valve is disposed in said induction passage downstream of said fuel injector, wherein said induction passage extends substantially horizontally and said fuel injector disposed such that the longitudinal axis thereof extends substantially horizontally in a vicinity of a longitudinal axis of said induction passage.

2. An intake system according to claim 1, wherein said throttle valve and said fuel injector are disposed in a throttle body defining a part of said induction passage.

3. An intake system according to claim 2, wherein a fuel supply circuit for supplying the fuel to said fuel injector includes a fuel inlet passage leading to said fuel injector and a fuel outlet passage for returning the excess fuel, and wherein at least said fuel outlet passage extends upwardly above a horizontal plane containing the axis of said fuel injector.

4. An intake system according to claim 3, wherein said fuel injector is housed in a holder provided in said throttle body, and said fuel supply circuit includes a fuel inlet chamber and a fuel outlet chamber which are formed between said fuel injector and said holder, while said fuel inlet passage and said fuel outlet passage are formed in said holder, said fuel inlet chamber and said fuel outlet chamber being respectively connected through said fuel inlet passage and said fuel outlet passage to a fuel inlet port and a fuel outlet port which are formed in said throttle body.

5. An intake system according to claim 4, wherein said holder and said throttle body are formed as separate members.

6. An intake system according to claim 4, wherein at least a portion of said induction passage is provided at with a fuel heating means.

7. An intake system according to claim 4, wherein both said fuel inlet passage and said fuel outlet passage extend upwardly above said horizontal plane.

8. An intake system according to claim 4, wherein said inlet passage extends in said horizontal plane.

9. An intake system according to claim 4, wherein said fuel inlet passage extends upwardly below said horizontal plane towards said fuel injector.

10. An intake system for an automotive internal combustion engine having cylinders and intake ports extending outwardly therefrom, said intake system comprising:
an intake manifold having an upstream end defining an opening and branched downstream ends connected to said intake ports, respectively, said intake manifold being disposed on the engine at a position which is not higher than a top surface of the engine;
means for defining a substantially horizontally extending induction passage having a downstream end connected said opening in said upstream end of said intake manifold;
a throttle valve disposed in said induction passage;
an electrically control fuel injector disposed in said induction passage upstream of said throttle valve and having a longitudinal axis, a substantially circular cross-section and an injection orifice;
means for supporting said fuel injector in said induction passage such that the longitudinal axis of said fuel injector substantially parallel to a longitudinal axis of said induction passage and said injection orifice is directed toward said throttle valve;

said supporting means defining therein a first fuel passage for supplying fuel from a fuel source to said injector and a second fuel passage for returning excess fuel from said fuel injector toward said fuel source, at least said second fuel passage being disposed upwardly of said axis of said fuel injector and extending generally upwardly from said fuel injector; and means responsive to engine operational conditions for electrically controlling the fuel injection operation of said fuel injector.

11. An intake system according to claim 10, wherein the means for defining a substantially horizontal induction passage include a throttle body which rotatably accommodates said throttle valve, the supporting means comprises a holder connected to an upstream end of said throttle body, said holder having a housing portion disposed substantially at a center of a cross-section of said induction passage and at least one spider extending radially from said housing portion, an inner surface of said housing portion and an outer surface of said injector cooperating to define therebetween a fuel inlet chamber and a fuel outlet chamber which are communicated with said fuel passage and said second fuel passage, respectively.

12. An intake system for an automotive internal combustion engine having cylinders and intake ports extending outwardly therefrom, said intake system comprising:

an intake manifold having an upstream end defining an opening and branched downstream ends connected to said intake ports, respectively;

means for defining a substantially horizontally extending induction passage having a downstream end connected to said opening in said upstream end of said intake manifold including a throttle body;

a throttle valve rotatably accommodated in said throttle body;

an electrically controlled fuel injector disposed in said induction passage upstream of said throttle valve and having a longitudinal axis, a substantially circular cross-section and an injection orifice;

means for supporting said fuel injector in said induction passage such that the longitudinal axis of said fuel injector is substantially parallel to a longitudinal axis of said induction passage and said injection orifice is directed toward said throttle valve;

said supporting means defining therein a first fuel passage for supplying fuel from a fuel source to said injector and a second fuel passage for returning excess fuel from said fuel injector toward said fuel source, at least said second fuel passage being disposed upwardly of said axis of said fuel injector and extending generally upwardly from said fuel injector, said supporting means further comprising a holder connected to an upstream end of said throttle body, said holder having a housing portion disposed substantially at a center of a cross section of said induction passage and at least one spider extending radially from said housing portion, an inner surface of said housing portion and the outer surface of said injector cooperating to define therebetween a fuel inlet chamber and a fuel outlet chamber which are communicated with said first fuel passage and said second fuel passage, respectively, said at least one spider extends upwardly from said housing portion and is provided therein with said first and second fuel passages; and means responsive to engine operational conditions for electrically controlling the fuel injection operation of said fuel injector.

13. An intake system for an automotive internal combustion engine having cylinders and intake ports extending outwardly therefrom, said intake system comprising;

an intake manifold having an upstream end defining an opening and branched downstream ends connected to said intake ports, respectively;

means for defining a substantially horizontally extending induction passage having a downstream end connected said opening in said upstream end of said intake manifold including a throttle body;

a throttle valve rotatably accommodated in said throttle body;

an electrically controlled fuel injector disposed in said induction passage upstream of said throttle valve and having a longitudinal axis, a substantially circular cross-section and an injection orifice;

means for supporting said fuel injector in said induction passage such that the longitudinal axis of said fuel injector is substantially parallel to a longitudinal axis of said induction passage and said injection orifice is directed toward said throttle valve;

said supporting means defining therein a first fuel passage for supplying fuel from a fuel source to said injector and a second fuel passage for returning excess fuel from said fuel injector toward said fuel source, at least said second fuel passage being disposed upwardly of said axis of said fuel injector and extending generally upwardly from said fuel injector, said supporting means further comprises a holder connected to an upstream end of said throttle body, said holder having a housing portion disposed substantially at a center of a cross-section of said induction passage and at least one spider extending radially from said housing portion, an inner surface of said housing portion and an outer surface of said injector cooperating to define therebetween a fuel inlet chamber and a fuel outlet chamber which are communicated with said first fuel passage and said second fuel passage, respectively, said holder has a substantially vertical spider and a substantially horizontal spider, said first fuel passage and said second fuel passage being formed in said substantially horizontal spider and said substantially vertical spider, respectively; and means responsive to engine operational conditions for electrically controlling the fuel injection operation of said fuel injector.

14. An intake system for an automotive internal combustion engine having cylinders and intake ports extending outwardly therefrom, said intake system comprising:

an intake manifold having an upstream end and branched downstream ends connected to said intake ports, respectively;

means for defining a substantially horizontally extending induction passage having a downstream end connected to said opening and said upstream end of said intake manifold including a throttle body;

a throttle valve rotatably accommodated in said throttle body;

an electrically controlled fuel injector disposed in said induction passage upstream of said throttle valve and having a longitudinal axis, a substantially circular cross-section, and an injection orifice;

means for supporting said fuel injector in said induction passage such that the longitudinal axis of said fuel injector is substantially parallel to a longitudinal axis of said induction passage and said injection orifice is directed toward said throttle valve;

said supporting means defining therein a first fuel passage for supplying fuel from a fuel source to said injector and a second fuel passage for returning excess fuel from said fuel injector toward said fuel source, at least said second fuel passage being disposed upwardly of said axis of said fuel injector and extending upwardly from said fuel injector, said supporting means comprises a holder connected to an upstream end of said throttle body, said holder having a housing portion disposed substantially at a center of a cross section of said induction passage and at least one spider extending radially from said housing portion, an inner surface of said housing portion and an outer surface of said injector cooperating to define therebetween a fuel inlet chamber and a fuel outlet chamber which are communicated with said first fuel passage and said second fuel passage, respectively, said holder has a lower spider and an upper spider extending downwardly and upwardly from said housing portion, respectively, said first and second fuel passage being formed in said lower and upper spiders, respectively;

means responsive to engine operational conditions for electrically controlling the fuel injection operation of said fuel injector.

15. An intake system according to claim 10, further including heating means disposed over at least a part of a length of the means for defining the induction passage.

16. An intake system according to claim 15, wherein said heating means comprises a heated water passage extending along said induction passage and communicating with a cooling water jacket of said engine.

* * * * *